April 21, 1942.  H. PURAT  2,280,262
PRESSURE SWITCH
Filed Dec. 12, 1940    2 Sheets-Sheet 1

INVENTOR
Hugo Purat.
BY Harness, Dickey & Pierce
ATTORNEYS.

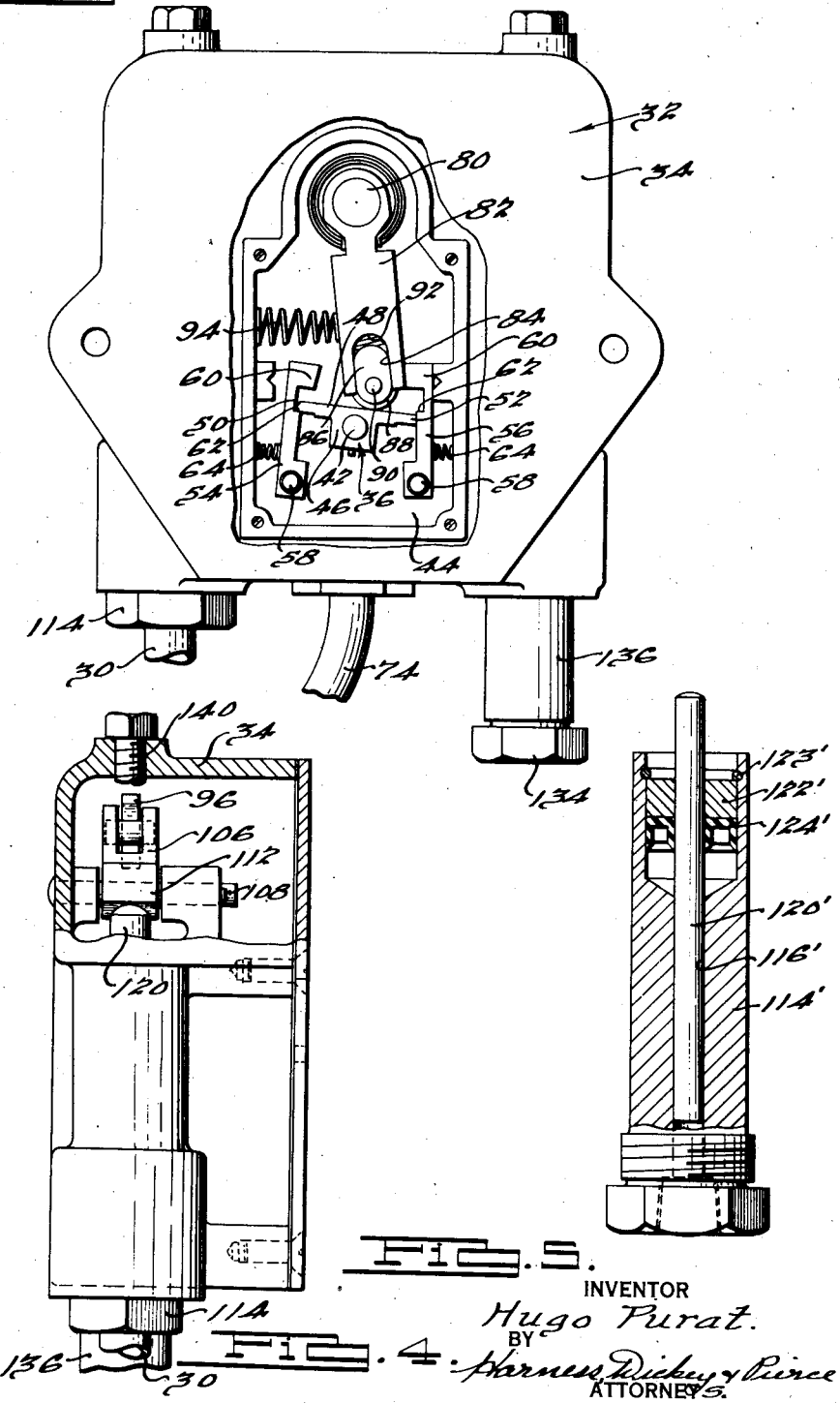

Patented Apr. 21, 1942

2,280,262

UNITED STATES PATENT OFFICE 2,280,262

PRESSURE SWITCH

Hugo Purat, Detroit, Mich., assignor to Progressive Welder Company, Detroit, Mich., a corporation of Michigan Application December 12, 1940, Serial No. 369,729

5 Claims. (Cl. 200—82)

This invention relates to welding apparatus and particularly relates to improved pressure switch constructions adapted for use in welding apparatus.

One of the primary objects of the present invention is to provide an improved pressure switch of the type mentioned which is efficient and positive in its action, yet which is economical to manufacture and simple in construction.

Another object of the invention is to provide an improved pressure switch of the type mentioned which may be readily adapted for use on different welding apparatus requiring different welding pressures.

Another object of the invention is to provide improved pressure responsive means for actuating an electric snap switch which is positive and sensitive in its action.

Other objects of the invention will become apparent from the following specification, the drawings relating thereto and from the claims hereinafter set forth.

In the drawings, in which like numerals are used to designate like parts throughout the several different views:

Fig. 3 is a rear elevational view of the structure shown in Fig. 2 having a portion of the housing removed to show portions of the snap switch in elevation;

Fig. 4 is a side elevational view of the structure shown in Fig. 2 having a portion of the housing removed and showing a portion of the pressure responsive means in elevation; and Fig. 5 is a vertical cross-sectional view, with the plunger or piston in elevation, of a modified form of piston and sleeve assembly according to the present invention.

Figures 1, 2:
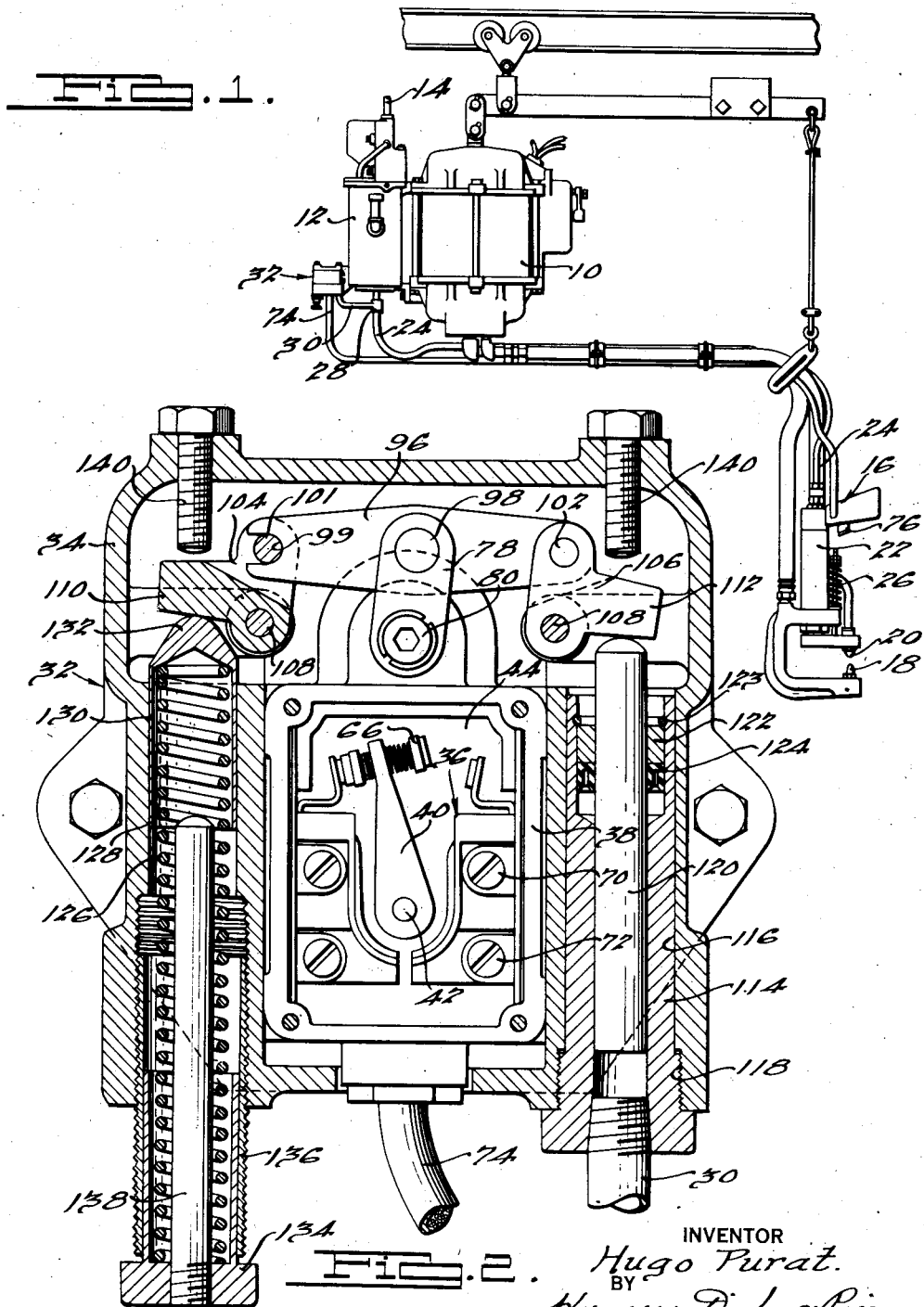
Fig. 1 is a side elevational view of one type of welding apparatus having a pressure switch, according to the present invention, associated therewith.
Fig. 2 is an enlarged, vertical cross-sectional view of the pressure switch illustrated in Fig. 1.

In welding apparatus of the type to which the pressure switch of the present invention is particularly adapted, it is the practice to move the welding electrodes into engagement with the work under pressure and to maintain the electrodes in such engagement under predetermined pressure during the welding operation, or at the time when the welding current is being applied. According to the present invention, a pressure switch is provided which is associated with the hydraulic pressure line which forces the electrodes together so that the switch is directly responsive to the pressure applied to the electrodes; and the electric switch, which controls the passage of electric current to the electrodes, is not actuated until the welding pressure has been built up to a predetermined amount. Such snap switch is automatically actuated as soon as such predetermined amount is reached. As soon as the welding pressure is released or relieved, the current is automatically cut off.

Referring to Fig. 1, one form of welding apparatus is shown by way of illustration, which is adapted to have a pressure switch according to the present invention associated therewith. The welding apparatus there illustrated is substantially that disclosed in the United States Patent of Wm. H. Martin, No. 2,136,490, patented August 9, 1938. It is to be understood that the particular welding apparatus shown is merely to be considered as illustrative and that the pressure switch according to the present invention is adapted for use on other types of welding apparatus as well.

The welding apparatus there shown, in general, comprises a source of supply of an electric current that is transformed to produce the welding current and a source of supply of air under pressure that is conducted to a booster and transmitted hydraulically to produce the welding pressure. A source of supply of cooling liquid for cooling the electrodes and cable is also preferably provided.

The welding apparatus includes a transformer which is indicated at 10 and which may be suitably connected to the main lines of the commercial circuit. A booster 12 is connected to the transformer housing and is connected to a suitable source of air under pressure by a conduit 14.

A welding gun is generally indicated at 16 and includes welding electrodes 18 and 20. The electrode 20 is connected to a reciprocating piston which is disposed within a cylinder 22. A conduit 24 is connected to the head end thereof for conducting the fluid under pressure to the cylinder and for forcing the electrode 20 toward electrode 18 and thus exerting the welding pressure on the work. The piston is returned to its initial position by means of a spring 26.

The conduit 24 communicates with an hydraulic source disposed within the booster 12 and has a T connection 28 interposed therein adjacent the booster housing providing a by-pass for the fluid under pressure. A by-pass conduit 30 is associated with the by-pass of the T connection so that it will be evident that the same pressure is exerted in passage 30 as exists in conduit 24.

Reference may be had to the Martin patent above mentioned for a more detailed description of the apparatus so far described.

A pressure switch according to the present invention is generally indicated at 32 in Fig. 1 and is disclosed in detail in Figs. 2, 3 and 4. Referring to these figures, the pressure switch comprises a housing 34 within which a snap switch generally indicated at 36 is disposed. Such snap switch is of conventional construction and includes a housing 38 having the snap switch mechanism mounted therein as a unit. Such mechanism includes a pivoted switch arm 40 which is suitably fixed to the forward end of pivot shaft 42 for oscillation therewith. The pivot shaft 42 is suitably mounted on bearings fixed to a vertical partition wall 44 of the housing 38; and the rear end of the shaft 42 projects rearwardly of the housing and has a rocker member 46 fixed thereto.

The member 46 has a flat top surface 48 and has its ends 50 and 52 tapered outwardly and downwardly slightly. A pair of stop arms 54 and 56 are pivotally mounted upon suitable pivot pins 58 adjacent the lower ends thereof; and such members 54 and 56 are each provided with inwardly disposed projections 60 adjacent the top thereof and recesses providing stop shoulders 62 against which the ends 50 and 52 are adapted to abut. The members 54 and 56 are normally urged inwardly by means of spiral springs 64.

It will thus be seen that as the rocker member 46 is rocked about its center, the shaft 42 is rotated or oscillated, moving or oscillating with it the contact arm 40.

The contact arm 40 has a transversely extending contact bar 66 resiliently mounted to the upper end thereof. As such arm 40 is rotated clockwise, viewing Fig. 2, the contact 66 engages a pair of separate electrical contact members 68 which are mounted within housing 38. The contact members 68 are connected to contact connections 70 and 72, respectively. Circuit lead wires, which are disposed within cable 74, are connected to the contacts 70 and 72, respectively.

Such circuit wires are connected to the circuit of the secondary, so that when the snap switch is closed, through contact of the member 66 with contacts 68, the welding current flows in the circuit of the secondary.

The cycle of operation of the welding apparatus is provided by closing the circuit of the primary coil by means of a trigger 76, mounted on the handle of the gun, which closes a stop switch in the primary circuit.

The opposite side of the snap switch is also constructed with contacts and terminals similar to 66, 68, 70 and 72, but such contacts merely serve as stops in the operation of the present structure. However, their presence makes it possible to connect the snap switch so that it will operate in either direction.

The rocker member 46 is caused to oscillate by means of an actuating arm 78 having the lower end fixed to a shaft 80 so that such shaft is rotated or oscillated upon movement of the arm 78. The shaft 80 is rotatably journaled within suitable bearings mounted on the upper end of the housing 38 and projects rearwardly within the housing. A depending arm 82 is suitably fixed to the rear end of the shaft 80, so that it oscillates upon rotation of the shaft in either direction. The lower end of the member 82 is provided with an axial bore therein having oppositely disposed, longitudinal apertures 84 provided through the side wall and opening through the lower end. Slide members 86 are disposed within apertures 84 and slidably engage the side edges thereof. A roller 88 is pivotally mounted on the lower ends of members 86 by means of a pin 90; and such roller is resiliently urged into engagement with the flat surface 48 by means of a spiral spring 92 disposed within the axial bore and resiliently urging the roller 88 downwardly.

It will thus be seen that as the arm 78 is shifted, the arm 82 is correspondingly shifted so that the roller 88 rolls on the flat surface 48 and passes across the center line of the shaft 42. The arm 82 is resiliently urged toward the right, viewing Fig. 3, by means of a spiral spring 94. As the arm 78 is moved so that the member 82 is moved clockwise, viewing Fig. 3, the lower end of member 82 first strikes against projection 60, thereby moving it outwardly so that projection 50 is released from engagement with shoulder 62. The roller 88 has then passed beyond the center of shaft 42, so that the rocker member 46 is snapped down to rotate clockwise, thereby shifting the arm 40 so that the contact 66 bridges contacts 68. The arm 56 has then been moved inwardly by spring 64, so that end 52 rests upon stop shoulder 62 of such member 56.

It will be seen that the movement of the arm 82 in this direction is resisted by the coil spring 94, and the electric contact will be maintained so long as the elements are in the position just described. If the force is released or relieved on arm 78, it will be appreciated that the spring 94 acts to return the elements to the position shown in Fig. 3, opening the secondary circuit.

The arm 78 is automatically shifted in direct response to variations in the welding pressure present in conduit 24. The mechanism for automatically shifting such arm includes a walking beam member 96 which is pivotally connected substantially at its center to the upper end of actuating arm 78 by means of a pivot pin 98. The ends of member 96 are formed with forked recesses 99 which receive therein, respectively, pins 101 and 102. Such pins are fixed to the upper ends of the upwardly extending arms of bellcrank members 104 and 106 which are pivotally mounted to the housing 34 by means of pivot pins 108. The other arms 110 and 112, respectively, of the bellcrank members 104 and 106 project outwardly for purposes that will be described in detail hereinafter. The pins 101 and 102 provide the operative connection between bellcrank members 104 and 106 and the opposite ends of the beam member 96.

It will thus be seen that as the arm 112 is moved upwardly, the beam 96 is shifted to the left, viewing Fig. 2, so that the arm 78 is rotated counterclockwise. The means for so moving the arm 112 upwardly in direct response to pressure increase in conduits 24 and 30 comprises a piston and sleeve assembly which includes a sleeve 114 which is threadably received within a bore 116 formed in the housing 34 and having the lower end thereof tapped, as indicated at 118. The conduit 30 is connected to the sleeve 114 by a suitable fitting so that the hydraulic pressure within conduit 30 is transmitted directly into the interior of bore 116.

A piston or plunger 120 is slidably disposed within the sleeve 114 and has a tight sliding fit with the wall thereof. The upper end of the sleeve passes through a guide ring member 122 fixedly disposed within the upper end of sleeve 114, by a split, resilient ring 123 which engages within a groove in the sleeve. A rubber seal 124 is associated with the member 122 and the sleeve to prevent the leakage of hydraulic fluid through the sleeve. It will thus be seen that the piston and sleeve assembly may be readily positioned within the housing or removed therefrom as a unit. The bore through the sleeve and the piston 120 are of predetermined areas, so that such piston exerts a predetermined force on the arm 112 to move it upwardly.

The movement of the piston 120 upwardly, and therefore, the shifting of arm 78 in a counterclockwise direction, is resisted by means of a spiral spring 126 which is disposed within a bore 128 formed in housing 34. The bore 128 is substantially parallel to and disposed on the opposite side of the housing from bore 116. The upper end of the spring 126 is received within a cup-shaped member 130, which is slidably disposed within the upper end of bore 128 and so positioned that the upper end of the cup 132 bears against arm 110 of bellcrank member 104.

The lower end of spring 126 is received within a cup member 134 which is welded to a sleeve 136 having the exterior thereof threaded for reception within the threaded lower end of bore 128. The member 136 may thus be adjustably positioned in the bore to vary the resistance of spring 126. An axially extending guide rod 138 is fixed to the lower end of member 134 and extends upwardly within spring 126 to prevent such spring from buckling.

Adjustable stop screws 140 are threaded through suitable tapped openings in housing 34 above the arms 110 and 112, respectively, to limit the upward movement of such arms.

It will thus be seen that as the pressure builds up in conduit 24, and, consequently, conduit 30, that the hydraulic force within such conduits tends to move the piston 120 upwardly. Such upward movement is resisted by spring 126, and the piston cannot move upwardly to shift the arm 78 until it has reached a predetermined value. At such time, the upward movement of the piston causes the bellcrank lever 106 to rock, shifting the beam 96 to the left, viewing Fig. 2, and rocking arm 78 to snap the switch arm 40 to its closed position. The pressure required to shift the arm is determined by the proper welding pressure, so that the welding current is not supplied to the welding electrodes until such proper pressure has been reached. When such pressure is relieved, the snap switch is instantly snapped open and the spring 126 returns the piston 120 to its initial position where it will remain until the welding pressure builds up again to its predetermined amount.

Different welding pressures are proper for different apparatus or for different welding operations, and the construction of the present invention is adapted to be suited to such differences in the pressures desired. The apparatus may be readily adapted to a different pressure by removing the piston and sleeve assembly and inserting another in which the piston and sleeve bore are of the proper and different cross-sectional areas.

In Fig. 5, another form of piston and sleeve assembly is illustrated in which the corresponding parts are given primed numerals. In this instance, the area of the bore 116' and the cross-sectional area of the piston 120' are less than the corresponding areas of bore 116 and piston 120, so that a greater welding pressure would be necessary to overcome the resistance of spring 126 than in the main embodiment above described.

Formal changes may be made in the specific embodiment of the invention described without departing from the spirit and substance of the invention, the scope of which is commensurate with the appended claims.

What is claimed is:

1. A pressure switch structure comprising a snap switch including a shiftable actuating arm to cause closing and opening of said switch, and pressure responsive means operatively connected to said arm for shifting said arm, said means comprising a beam member pivotally connected intermediate its ends to said arm, lever members operatively connected to the opposite ends of said beam member, a plunger disposed adjacent one end of said beam member, means movably mounting said plunger for movement in one direction in response to predetermined pressure increase, said plunger being so positioned that it engages its adjacent lever when moved in said one direction to shift said beam, and resilient means disposed adjacent the other end of said beam and engaging its adjacent lever to resist the movement of said plunger in said one direction.

2. A pressure switch structure comprising a housing, a snap switch disposed within said housing and including a shiftable actuating arm, a beam member within said housing pivotally connected intermediate its ends to said arm, bellcrank members pivotaly mounted within said housing and disposed adjacent the ends of said beam, one end of each of said bellcrank members being operatively connected to its adjacent end of the beam, a plunger movably mounted within said housing adjacent one end of said beam and movable in one direction in response to predetermined pressure increase, said plunger engaging the other arm of one of said bellcrank members when moved in said one direction to shift said beam, resilient means disposed within said housing adjacent the opposite end of said beam, said resilient means engaging the other arm of the other of said bellcrank members to resist the movement of said plunger in said one direction.

3. A pressure switch structure comprising a housing, a snap switch disposed within said housing and including a shiftable actuating arm, and pressure responsive means operatively connected to said arm for shifting said arm, said means comprising a beam member operatively connected to said actuating arm, a unitary plunger and sleeve assembly removably mounted within said housing adjacent one end of said beam member, said plunger being movable with respect to said sleeve in one direction in response to predetermined pressure increase, resilient means resisting the movement of said plunger in said one direction, and a bellcrank lever member pivotally mounted within said housing, said bellcrank member having one arm thereof operatively connected to one end of said beam member and having the other arm thereof positioned to be engaged by said plunger and to be moved thereby upon movement of said plunger in said one direction to thereby shift said actuating arm.

4. A pressure switch structure comprising a snap switch including a shiftable actuating arm and pressure responsive means operatively connected to said arm for shifting said arm, said means comprising a beam member operatively connected to said actuating arm, a plunger movable in one direction in response to predetermined pressure increase, resilient means resisting the movement of said plunger in said one direction, and a bellcrank lever member pivotally mounted within said housing, said bellcrank member having one arm thereof operatively connected to one end of said beam member and having the other arm thereof positioned to be engaged by said plunger and to be moved thereby upon movement of said plunger in said one direction to thereby shift said actuating arm.

5. A pressure switch structure comprising a snap switch including a shiftable actuating arm to cause closing and opening of said switch, and pressure responsive means operatively connected to said arm for shifting said arm, said means including a member operatively connected to said actuating arm, a plunger movable in one direction in response to predetermined pressure increase, resilient means resisting the movement of said plunger in said one direction, and a bellcrank member operatively connected to said beam member and engaged by said plunger to be moved thereby upon movement of said plunger in said one direction to thereby shift said actuating arm.

HUGO PURAT.